United States Patent Office 3,560,294
Patented Feb. 2, 1971

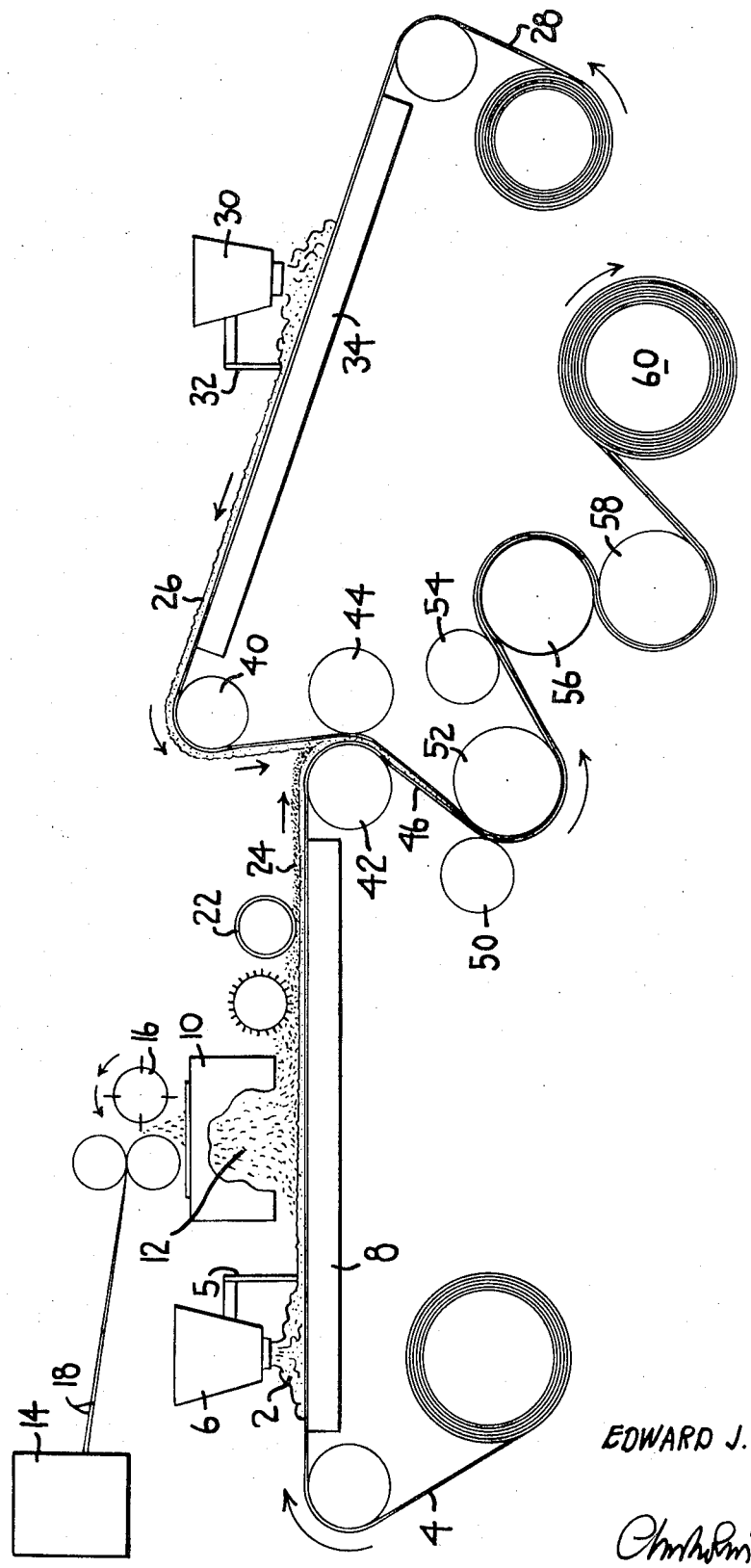

3,560,294
METHOD AND APPARATUS FOR COMBINING A VISCOUS RESIN AND GLASS FIBER STRANDS
Edward J. Potkanowicz, Apollo, Pa., assignor to PPG Industries, Inc., Pittsburgh, Pa., a corporation of Pennsylvania
Filed Aug. 29, 1967, Ser. No. 664,094
Int. Cl. B32b 31/12
U.S. Cl. 156—276                                      6 Claims

ABSTRACT OF THE DISCLOSURE

A method and apparatus for combining a viscous resin and reinforcing glass fiber strands. The resin is doctored onto a polyethylene film and chopped glass fiber strands are deposited on the resin. Another polyethylene film containing a layer of resin is rolled onto the glass fiber strands to form a composite laminate and the laminate is pressed together. The laminate is then flexed alternately under pressure into convex and concave arcuate shapes to cause the viscous resin to thoroughly impregnate the chopped strands.

---

This invention relates to a method and apparatus for combining a viscous resin and reinforcing glass fiber strands. The invention has particular relation to a method for combining a "B" stage thermo-setting resin and chopped glass fiber strands into a sheet molding compound that can be stored and later shaped and cured to make reinforced thermo-setting resinous articles.

Continuous methods for forming corrugated, glass fiber reinforced thermo-setting resinous panels are well-known in the art. Some of these methods are set forth in U.S. Pats. Nos. 2, 784,763, 2,927,673, 2,969,301, 3,109,763 and 3,137,601. In such processes the thermo-setting resin is cured immediately after combination with the glass fiber strands in the form and shape of a corrugated building panel. In such manufacture the resin is in a relatively fluid form and the impregnation of the glass fiber strands with the resin is readily effected.

A raw material which can be used to form many shapes and sizes of reinforced thermo-setting resinous articles is now being produced commercially in a form in which the thermo-setting resin is in the "B" stage of polymerization and is not cured to a final rigid shape. The "B" stage resin and glass fiber strands are brought together and stored in such condition that they can be shaped and cured at some later date either by the manufacturer of the raw material or by his customers. In the manufacture of such raw material, the resin is much more viscous because it is loaded with fillers and materials which inhibit reaction of the resin beyond the "B" stage. This loading of the resin has created problems in combining the resins and reinforcing glass fibers.

In accordance with the present invention a method and apparatus are provided for combining the viscous "B" stage resin and reinforcing glass fiber strands. In this method the resin is first doctored onto a moving polyethylene film into a smooth continuous layer of uniform thickness. The glass fiber strands, in chopped form, are then distributed uniformly, but in random directions, onto the surface of the resin. Another polyethylene film containing a similarly deposited layer of "B" stage thermo-setting resin is then moved in an opposite path towards the first mentioned layer of film and resin, but at a height which is above that of the plane of movement of the first layer of film, resin and chopped glass fibers. The second film and resin are then rolled down onto the glass fibers to form a laminate. The laminate is then squeezed together by passing it between a pair of closely spaced rotating rollers. Thereafter the laminate is flexed alternately under rolling pressure into convex and concave arcuate shapes to cause the viscous resin to thoroughly impregnate the chopped strands.

The advantages and operation of the invention are described in further detail in conjunction with the accompanying drawing which is a diagrammatic representation of the apparatus and flow process involved in the performance of the invention.

In accordance with the present invention a viscous "B" stage, thermo-setting resin 2 is spread in a uniform thickness layer upon a polyethylene film 4 by means of a doctor blade 5. The resin can be supplied by any suitable means such as a hopper 6. An example of a preferred resinous "B" stage resinous mixture is as follows:

| Ingredient: | Amount (pounds) |
|---|---|
| Polyetser resin | 40.8 |
| Calcium carbonate | 40.8 |
| Clay | 12.2 |
| Zinc stearate | 0.8 |
| Tertiary butyl peroxide | 0.4 |
| Styrene | 3.3 |
| Zinc oxide | 1.6 |

Viscosity=20,000–30,000 centipoises measured at 70° F. in a Brookfield Viscometer using a No. 4 spindle rotating 12 revolutions per minute.

The film 4 and resin 2 are then moved along supporting plate 8 underneath a chopping station generally designated as 10. At station 10 a plurality of chopped strands 12 are deposited as a uniform layer on top of the resin 2. The chopped strands are provided by conventional chopping apparatus which includes a creel 14 and a chopping assembly 16 which severs continuous strands 18 into chopped lengths.

The film 4 with the superposed layers of resin 2 and chopped strands 12 next passes underneath a felt-covered roll 22 which exerts some pressure on the strands and compresses them into the layer of resin. The individual chopped strands are not bound together by any resinous binders such as are normally employed in the production of chopped strand mat. It has been found that the ultimate product is better when the strands are not bound together since the composite sheet molding compound is better able to flow into intricate shapes during molding and curing.

The chopped strands, even though somewhat compacted, are still in a fluffy layer 24 on top of the layer of resin 2. The chopped strands in layer 24 are compressed and enclosed in resin by the rolling action of a layer of resin 26 supported on a second polyethylene film 28. The resin 26 is applied to the film by means of hopper 30 and doctor blade 32 in the same manner as the resinous layer 2. The film 28 and resin 26 are moved toward the polyethylene film 4, resinous layer 2 and chopped strand layer 24 over plate 34 which at its delivery end is at an elevation that is higher than said chopped strand layer 24. The film 28 and resin 26 are moved around roller 40 and down onto the layer 24 of the glass fiber strands in a rolling motion to compact the strands and contain (laminate) them between the resinous layers 26 and 2. This composite laminate then passes through closely paced horizontally disposed rotating rollers 42 and 44 which apply a rolling pressure to press the resinous layers together and encase the individual glass fiber strands in the resin. The roller 40 is positioned above roller 42 so that the layer of resin 26 contacts the glass fibers at or before they begin to bend downwardly around roller 42. This overcomes the tendency of the glass fiber strands to be pushed back and built up into clumps as the layers of resin are brought together. This clumping occurs because the peripheral speed of the fibers is greater than the resin 2 as they pass around roller 42.

Due to the very viscous nature of the "B" stage thermosetting resin layers 2 and 26, it is necessary to work the composite laminated sheet 46 further to insure complete coating and impregnation of the strands with the resin. The composite sheet 46 is then pulled under tension between rotating rollers 50 and 52 so that roller 50 pushes the composite sheet against roller 52 at one point on the circumference. The composite sheet moves under tension around approximately 180° of the surface of rotating roller 52 and then proceeds into the nip formed between rollers 54 and 56. Roller 54 applies tangential contact and rolling pressure against the composite sheet to press the resin in and around the glass fiber strands. The composite sheet 46 travels under tension around approximately 180° of the surface of rotating roller 56 and passes between the nip formed by roller 56 and adjacent roller 58. The composite sheet next follows under tension around approximately 180–270° of rotating roller 58 to take up roller 60 to achieve the final mixing of the glass fiber strands and viscous resin. In the course of this arcuate flexing the composite sheet reverses its path of curvature three times, thereby ensuring good impregnation of the layer of strands with the resin.

The composite sheet thus prepared can be stored for a substantial lengh of time and later severed into lengths for final curing into various shapes. The polyethylene protective films 4 and 28 are removed from the thermosetting resin surfaces before curing. The sheet contains about 10 to 45 percent by weight of glass fibers.

The present invention provides an economic process for producing an inexpensive raw material for the manufacture of glass fiber reinforced thermo-setting resinous articles. The use of chopped strands which are chopped in situ and distributed on the "B" stage resin surface during the process, provides a less expensive product than if a pre-formed mat were used in the process. Not only is this method of incorporating the glass fiber strands cheaper, but it provides a better raw material as far as conforming to molds and shapes than if a bound chopped strand mat product is incorporated in the resin. The alternate convex and concave arcuate flexing of the composite layers of polyethylene film, "B" stage thermosetting resin and glass fibers under the pressure provided by tension provides intimate impregnation and mixing of the resin and glass fibers.

Various carrier films can be employed in the practice of the invention. Polyethylene is the preferred film, but other films such as cellophane can be used. The "B" stage thermo-setting resins most commonly used are "B" stage polyester resins although other "B" stage thermo-setting resin can be used.

The glass fiber strands employed in the practice of the invention are commercially available materials which are purchased in the form of roving and then chopped into desired lengths varying from one to two inches. A conventional roving product for such use is made up of 60 ends (strands) with each strand being made up of 204 filaments bound together by a size. The glass fibers are provided with a suitable chemical coupling agent for bonding to the resin. The coupling agent is conventionally applied to the fibers during their formation as an ingredient in the forming size. The formation of the glass fibers and the resin are conventional and are not considered to be part of the present invention.

Although the present invention has been described with respect to specific details of a preferred embodiment, such details are not to be considered as limits upon the scope of the invention except as set forth in the accompanying claims.

What is claimed is:

1. A method for combining reinforcing fibers and a viscous liquid which comprises,
moving a first flexible supporting sheet along a path,
applying a layer of the viscous liquid on the first supporting sheet, depositing a layer of fibers on the liquid,
moving a second supporting flexible sheet along a path in an opposite direction toward said first sheet at a greater elevation than the first sheet and the liquid and fibers thereon,
applying a layer of the viscous liquid on the second supporting sheet,
continuously folding the second sheet over the first sheet to provide rolling contact of the viscous liquid on the second sheet with the fibers on the first sheet to form a laminate,
pressing the laminate together and thereafter flexing the laminate, under pressure, into alternate convex and concave curvatures to thoroughly impregnate the fibers with the viscous liquid.

2. Apparatus for combining reinforcing fibers and a viscous liquid which comprises:
means for moving a first flexible supporting sheet along a path,
means for applying a layer of viscous liquid on the supporting sheet,
means for depositing a layer of fibers on the viscous liquid,
means for moving a second supporting sheet along a path,
means for applying a layer of a viscous liquid on the second supporting sheet,
means for continuously rolling the second sheet and layer of resin supported thereon onto the layer of fibers supported on the first sheet so as to sandwich the layer of fibers between the layers of resin and form a composite laminated sheet, and
means to flex the composite sheet under pressure into alternate convex and concave curvatures to thoroughly impregnate the fibers with the viscous liquid.

3. The apparatus of claim 2 wherein the means for moving the first flexible supporting sheet moves said first sheet in a generally horizontal path and the means for moving the second flexible supporting sheet moves said second sheet along a generally horizontal path in an opposite direction toward the first sheet at an elevation above said first sheet.

4. An apparatus as described in claim 2 wherein the means for thoroughly impregnating the fibers with the viscous liquid is composed of a series of pairs of rollers wherein the composite sheet passes around at least one half of the circumference of at least one of the rollers in said pairs.

5. The apparatus of claim 4 wherein the means for moving the second flexible supporting sheet is positioned so that the second sheet and resin thereon contact the glass fiber strands before they begin to pass around one of said pair of rollers.

6. An apparatus as described in claim 4 wherein the pairs of rollers are closely spaced so as to exert a rolling pressure against the composite sheet as it passes between the rollers.

References Cited
UNITED STATES PATENTS

| | | | |
|---|---|---|---|
| 3,109,763 | 12/1963 | Finger | 156—276 |
| 3,137,601 | 6/1964 | Menzer | 156—276X |

CARL D. QUARFORTH, Primary Examiner

S. HELLMAN, Assistant Examiner

U.S. Cl. X.R.

156—295